US009848536B2

(12) United States Patent
Van Mill et al.

(10) Patent No.: US 9,848,536 B2
(45) Date of Patent: *Dec. 26, 2017

(54) GRAIN CART WITH FOLDING AUGER

(71) Applicant: Unverferth Manufacturing Company, Inc., Kalida, OH (US)

(72) Inventors: Michael D. Van Mill, Shell Rock, IA (US); Ronald J. Schlimgen, Shell Rock, IA (US); John Walvatne, Waterloo, IA (US); Christopher M. Self, Aplington, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,015

(22) Filed: Feb. 22, 2016

(65) Prior Publication Data

US 2016/0165800 A1   Jun. 16, 2016

Related U.S. Application Data

(63) Continuation of application No. 14/720,533, filed on May 22, 2015, now Pat. No. 9,272,653, which is a
(Continued)

(51) Int. Cl.
*B60P 1/42* (2006.01)
*A01D 90/10* (2006.01)
*A01F 12/46* (2006.01)
*A01B 73/00* (2006.01)
*B65G 67/24* (2006.01)

(52) U.S. Cl.
CPC ............... *A01D 90/10* (2013.01); *A01B 73/00* (2013.01); *A01F 12/46* (2013.01); *B60P 1/42* (2013.01); *B65G 67/24* (2013.01)

(58) Field of Classification Search
CPC ............. B60P 1/42; A01F 12/46; A01D 90/10
See application file for complete search history.

(56) References Cited

U.S. PATENT DOCUMENTS

| 796,477 A | 8/1905 | Wallace |
|---|---|---|
| 1,689,963 A | 10/1928 | Pelton |

(Continued)

OTHER PUBLICATIONS

J&M Mfg. Co., Inc.'s Initial Invalidity Contentions dated Sep. 18, 2015, *Unverferth Mfg. Co., Inc. v. J&M Mfg. Co., Inc.*, No. 3:15-cv-01045-JZ, N.D. Ohio, 85 pages.
(Continued)

*Primary Examiner* — Scott Lowe
(74) *Attorney, Agent, or Firm* — Rothwell, Figg, Ernst & Manbeck, P.C.

(57) ABSTRACT

A grain cart and foldable auger assembly having an upper auger assembly portion with a discharge portion, a lower auger assembly portion with an intake portion, and a compound angle joint that allows the upper auger assembly portion to be moved between operating and transport positions. When in an operating position, the upper auger portion and the lower auger portion are offset from each other by an operating offset angle. When in a transport position, the upper auger assembly portion is offset from the lower auger assembly portion by a transport offset angle such that the upper auger assembly portions folded across the front of the grain cart in a non-obstructive and non-protruding manner.

14 Claims, 9 Drawing Sheets

Related U.S. Application Data continuation of application No. 13/786,401, filed on Mar. 5, 2013, now Pat. No. 9,039,340, which is a continuation of application No. 12/700,372, filed on Feb. 4, 2010, now abandoned.

(60) Provisional application No. 61/228,284, filed on Jul. 24, 2009, provisional application No. 61/152,521, filed on Feb. 13, 2009.

(56) References Cited

U.S. PATENT DOCUMENTS

| | | |
|---|---|---|
| 2,056,243 A | 10/1936 | Anderson |
| 2,772,767 A | 12/1956 | Seifert |
| 2,783,907 A | 3/1957 | Hudgins |
| 2,830,695 A | 4/1958 | Fennimore et al. |
| 3,010,295 A | 11/1961 | Kline |
| 3,014,575 A | 12/1961 | Kline |
| 3,016,128 A | 1/1962 | Hacker |
| 3,175,676 A | 3/1965 | Vander Schaaf |
| 3,241,657 A | 3/1966 | Buschbom |
| 3,252,562 A | 5/1966 | Brembeck |
| 3,283,925 A | 11/1966 | Gutekunst |
| 3,391,779 A | 7/1968 | Scheel et al. |
| 3,435,941 A | 4/1969 | Mayrath |
| 3,560,133 A | 2/1971 | Ryczek |
| 3,638,812 A | 2/1972 | Ryczek |
| 3,670,913 A | 6/1972 | Reaves |
| 3,721,333 A | 3/1973 | Boone |
| 3,860,010 A | 1/1975 | Anderson et al. |
| 3,938,684 A | 2/1976 | Quoiffy et al. |
| 4,029,228 A | 6/1977 | Shaver |
| 4,093,087 A | 6/1978 | DeCoene |
| 4,433,946 A | 2/1984 | Christianson et al. |
| 4,619,577 A | 10/1986 | Swanson |
| 4,662,812 A | 5/1987 | Busboom et al. |
| 4,714,398 A | 12/1987 | Rohwedder |
| 4,923,358 A | 5/1990 | Van Mill |
| 4,989,716 A | 2/1991 | Stuckey |
| 5,013,208 A | 5/1991 | Grieshop |
| 5,129,502 A | 7/1992 | Justice |
| 5,340,265 A | 8/1994 | Grieshop |
| 6,248,015 B1 | 6/2001 | Rayfield et al. |
| 6,261,050 B1 | 7/2001 | Kuhns |
| 6,296,435 B1 | 10/2001 | Wood et al. |
| 6,497,546 B2 | 12/2002 | Wood et al. |
| 6,711,884 B1 | 3/2004 | McLeod et al. |
| 6,767,174 B2 | 7/2004 | Cresswell |
| 7,090,066 B2 | 8/2006 | Kirsch |
| 7,134,830 B2 | 11/2006 | Wood |
| 7,267,519 B2 | 9/2007 | Cresswell et al. |
| 7,553,228 B2 | 6/2009 | Dillon |
| 3,047,757 A1 | 11/2011 | Wood |
| 8,585,343 B2 | 11/2013 | Wood |
| 2003/0175102 A1 | 9/2003 | Cresswell |
| 2004/0184905 A1 | 9/2004 | Kinzenbaw et al. |
| 2005/0238470 A1 | 10/2005 | Wood |
| 2007/0191080 A1 | 8/2007 | Voss |
| 2008/0210145 A1 | 9/2008 | Petersen et al. |

OTHER PUBLICATIONS

European Search Report and European Search Opinion Application No. EP10741606, dated Nov. 6, 2013, 7 pages.
Australian Examination Report in Application No. 2010213947, dated Apr. 15, 2014, 4 pages.
Parker, "838/938 Parker Grain Carts", brochure, 2005, 4 pages.
Par-Kan, "Par-Kan GW 200 Grain Weigh Wagon", webpage (http://www.par-kan.com/grain-weigh.html), May 13, 2006, 1 page.
Brent, "Brent Avalance 94 Series Grain Cart" brochure, 2007, 6 pages.
Parker, "Models 838 & 839 Grain Cart Operator's Manuel and Parts List", Dec. 2014, 4 pages.
Unverferth, "Corner Auger Grain Carts Operator's Manual Parts Catalog: Model 920 & 970 Corner Auger Grain Cart", Jul. 2014, 3 pages.
Unverferth Mfg. Co., Inc.'s Validity and Enforceability Contentions dated Oct. 8, 2015, *Unverferth Mfg. Co., Inc.* v. *J&M Mfg. Co., Inc.*, C.A. No. 3:15 cv-01045-JZ, N.D. Ohio, 23 pages.
Office Action dated Oct. 6, 2015 in Canadian Application No. 2,752,207, 3 pages.
Office Action dated Sep. 6, 2016 in Canadian Application No. 2,752,20, 4 pages.
European Search Report in European Application No. 17163624.4, dated Aug. 21, 2017, 8 pages.

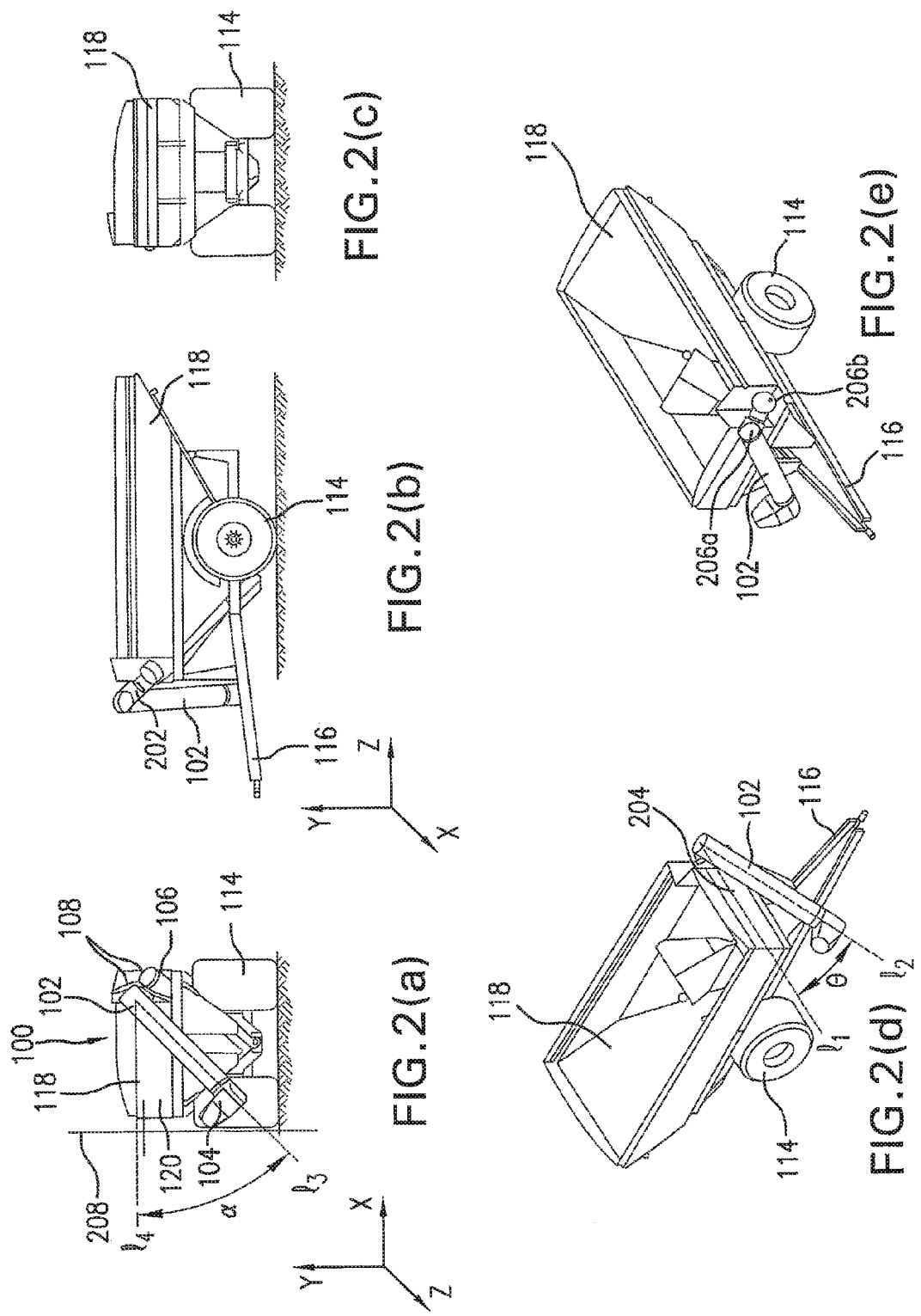

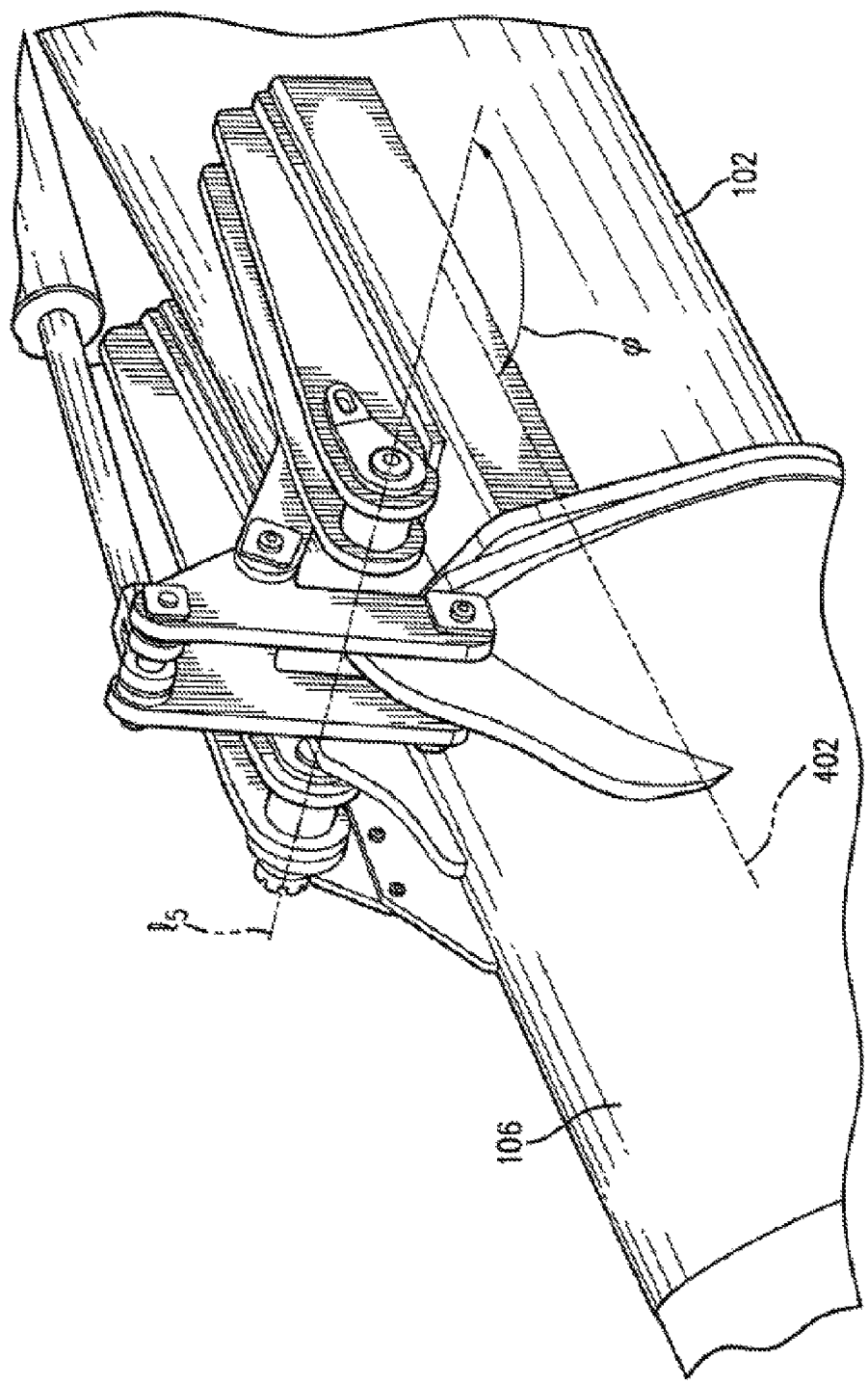

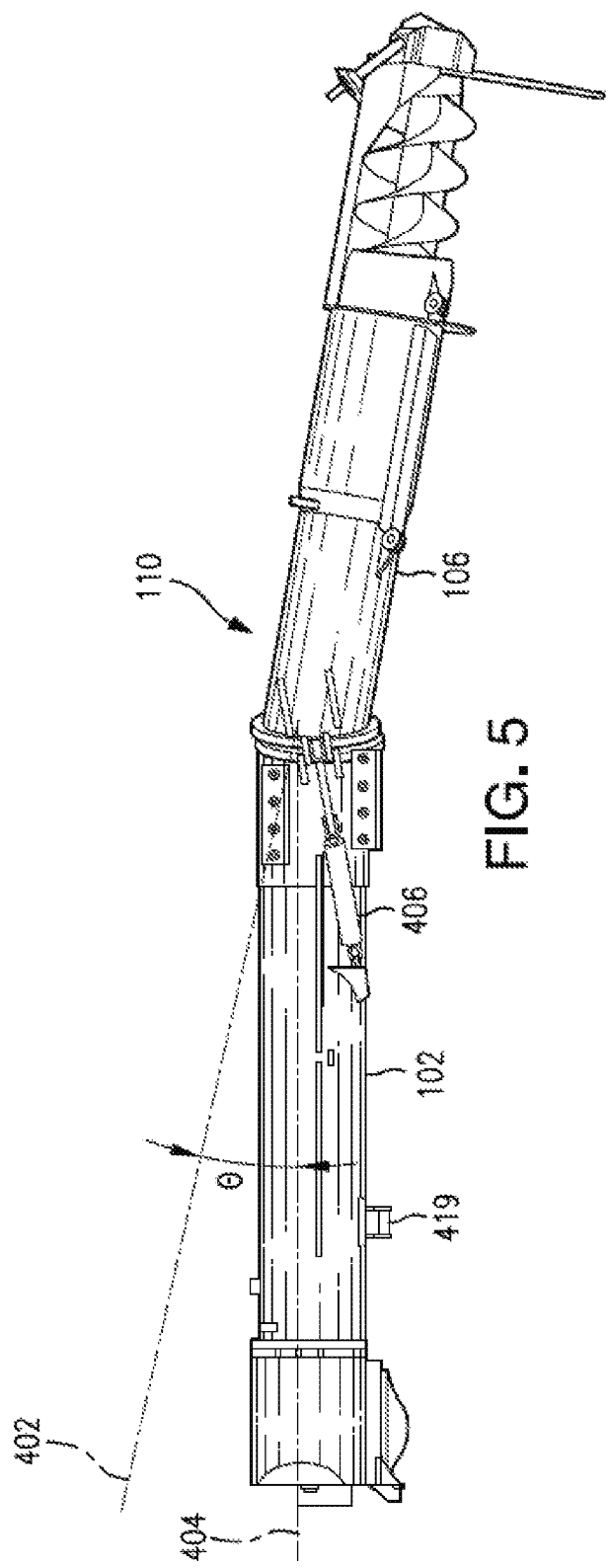

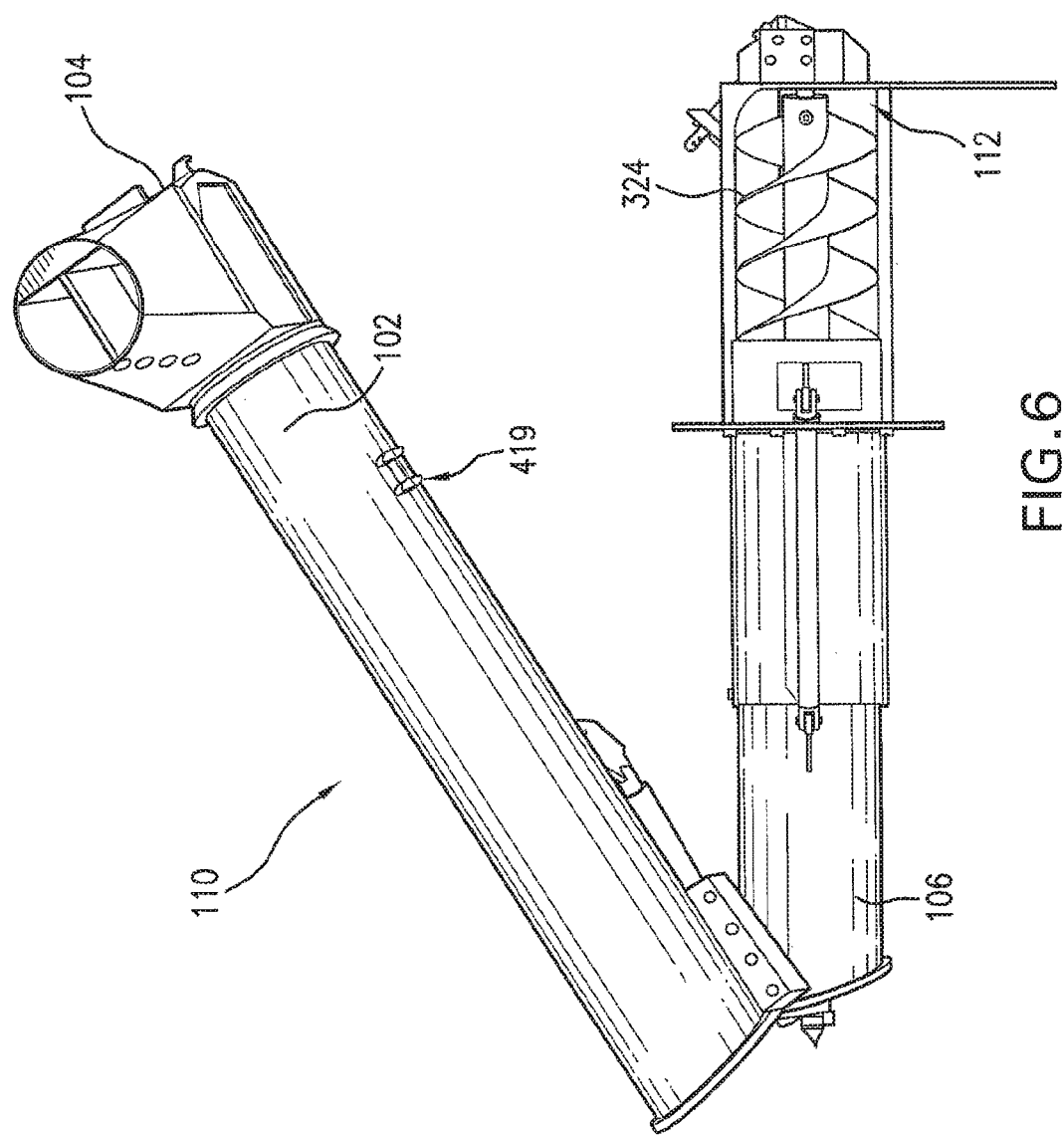

GRAIN CART WITH FOLDING AUGER

CROSS-REFERENCE TO RELATED APPLICATIONS

This application is a continuation of U.S. patent application Ser. No. 14/720,533, filed on May 22, 2015, which is a continuation of U.S. patent application Ser. No. 13/786,401, filed on Mar. 5, 2013, now U.S. Pat. No. 9,039,340, which is a continuation of U.S. patent application Ser. No. 12/700,372, filed on Feb. 4, 2010, now abandoned, and claims the benefit of U.S. Provisional Patent Application Ser. No. 61/152,521, filed on Feb. 13, 2009, and U.S. Provisional Patent Application Ser. No. 61/228,284, filed on Jul. 24, 2009, the disclosures of which are incorporated by reference herein in their entireties.

BACKGROUND OF THE INVENTION

Field of the Invention

The present invention relates generally to grain carts and, more particularly, to grain carts having folding augers.

Description of the Related Art

In agriculture, augers are frequently used to move material from a cart to another cart, silo, truck, or other storage facility. Augers used to move grain are known as grain augers and are frequently employed in grain carts. A typical grain auger includes an auger screw of constant diameter and pitch that is housed inside a tubular housing or shaft to form an auger assembly. An intake portion of the auger assembly can draw from a hopper (usually by gravity) attached to it to receive grain or other material from the hopper and the other end (i.e., the discharge end) has a chute or the like to guide the grain or other material into its destination. It is well known in the art to attach an auger assembly to a grain cart to off-load the grain cart.

As a grain cart with a fully extended auger can be somewhat unwieldy during transport, many grain carts employ folding augers that can open to an operating position and fold to a transport position. In general, a folding auger assembly includes a lower auger assembly and an upper auger assembly. When in the operating position, the upper and lower auger assemblies function as one co-linear auger. When in transport position, the upper auger portion folds to reduce the height and the width of the grain cart. Folding the auger assembly makes it easier to transport the grain cart on roads.

U.S. Patent Application Publication Nos. 2004/0184905, 2007/0119688, and 2005/0238470 as well as U.S. Pat. Nos. 5,655,872, 5,340,265, 4,846,621, 5,628,608, 6,422,376 all disclose folding augers with distinct disadvantages. For instance, none of them maximize side and forward reach when in an operating position and minimize transport size when in a transport position. Another disadvantage of prior art folding augers is that the folding motion may not clear the cab of some tractors, making it difficult to convert the auger between operating and transport positions.

SUMMARY OF THE INVENTION

One aspect of the present invention provides a grain cart comprising a wheeled frame; a container mounted on the frame and configured to hold a quantity of grain, the container having front, rear and laterally opposed side walls; a folding auger assembly having upper and lower auger assembly portions connected by a joint assembly, the lower auger assembly portion having a lower auger housing with first and second ends and a lower auger portion rotatably disposed in the lower auger housing, and the upper auger assembly portion having an upper auger housing with first and second ends and an upper auger portion rotatably disposed in the upper auger housing; wherein the first end of the lower auger housing has an intake opening proximate a bottom of the container to receive grain and the second end of the lower auger housing is disposed adjacent a forward corner of the container where the front wall intersects one of the laterally opposed side walls; wherein the first end of the upper auger housing is disposed adjacent the second end of the lower auger housing and the second end of the upper auger housing has a discharge opening to discharge grain from the container; and wherein the joint assembly defines a pivot axis about which the upper auger assembly portion is pivotable relative to the lower auger assembly portion between an operating position in which the first end of the upper auger assembly portion abuts the second end of the lower auger assembly portion to permit grain to be discharged from the container and a transport position in which the upper auger assembly portion extends downwardly from the second end of the lower auger assembly portion diagonally across the front wall of the container substantially between the laterally opposed side walls of the container to facilitate transporting the grain cart. When in the operating position, the upper auger assembly portion can be offset from the lower auger assembly portion by an operating offset angle. When in a transport position, the upper auger assembly portion can be offset from the lower auger assembly portion by a transport offset angle. In an embodiment, the pivot axis is oblique to at least one, and preferably both, of the respective longitudinal axes of the upper and lower auger assembly portions to improve reach in the operating position and/or reduce size in the transport position.

According to some embodiments of the invention, the operating offset angle is between 0° and 20°, preferably between 12° and 16°, and most preferably about 14.5°. According to some embodiments of the invention, the operating offset angle is a compound angle in at least two dimensions relative to the lower auger assembly portion and/or the front of the grain cart.

According to other embodiments of the present invention, the joint assembly can be configured to define a movable pivot axis about which the upper auger portion is foldable relative to the lower auger portion so that the orientation of the pivot axis relative to one or both of the auger assembly portions can change as the upper auger assembly portion is moved between operating and transport positions.

Another aspect of the present invention provides a grain cart comprising a wheeled frame; a container mounted on the frame and having a top and bottom and front, rear and laterally opposed side walls; a lower auger assembly portion having a lower auger housing and a lower auger portion disposed in the lower auger housing, the lower auger assembly extending upwardly from the container bottom; an upper auger assembly portion having an upper auger housing pivotally connected to the lower auger housing and an upper auger portion disposed in the upper auger housing, the upper auger assembly portion being pivotable relative to the lower auger assembly portion between an operating position wherein the upper auger assembly portion extends outwardly from the container at an angularly offset orientation relative to the lower auger assembly portion and a transport position wherein the upper auger assembly portion is disposed along one of the container walls; wherein the upper and lower auger portions include opposed ends configured to couple with one another in the operating position, at least one of the opposed ends has an angularly offset orientation with respect to a longitudinal axis of a respective one of the auger portions, and the at least one auger portion with an angularly offset end includes a universal joint that transmits rotational forces to the end through the angular offset. In other words, when the upper and lower auger assembly portions are connected or coupled, the universal joint functions to transfer rotational energy from the lower auger portion to the upper auger portion through the angular offset.

In an embodiment, a bearing hanger keeps the lower end or coupling at a constant angle relative to the lower auger axis. According to other embodiments of the present invention, the upper end or coupling can be connected to the rest of the upper auger portion by a universal joint to facilitate an angle between the upper coupling and an upper auger axis.

According to some embodiments of the present invention, the operating offset angle is greater than zero and less than 20°, preferably 12° to 16°, and more preferably 14.5°, and the bearing hanger maintains the lower coupling at an angle equal to the operating offset angle.

According to other embodiments of the present invention, the joint assembly can include an offset hinge portion. The offset hinge portion can include hinge mounts to mount to an upper auger portion and a lower auger portion. The offset hinge portion can be mounted to the upper and lower auger portions such that when the upper and lower auger portions are folded, a transport offset angle exists between them.

According to some embodiments of the present invention, the upper and lower auger portions can be connected by a movable joint having a hinge mounted to pivot relative to a plane of intersection of the upper and lower auger portions as the auger is moved between operating and transport positions.

Another aspect of the invention provides a grain cart comprising a wheeled frame with a hitch; a container mounted on the frame and having a top and bottom and front, rear and laterally opposed side walls; a lower auger assembly portion having a lower auger housing and a lower auger portion disposed in the lower auger housing, the lower auger assembly extending upwardly from the container bottom; an upper auger assembly portion having an upper auger housing pivotally connected to the lower auger housing and an upper auger portion disposed in the upper auger housing, the upper auger assembly portion being pivotable relative to the lower auger assembly portion between an operating position wherein the upper auger assembly portion extends outwardly from the container and a transport position wherein the upper auger assembly portion is disposed along one of the container walls; and wherein the rear wall of the container includes an upper wall portion extending downwardly at a first angle relative to horizontal and a lower wall portion extending downwardly from the upper wall portion at a second angle relative to horizontal, wherein the first angle is less than the second angle.

In some embodiments, the first angle is about 2° less than the second angle. Preferably, the first angle is about 26° and the second angle is about 28°.

Yet another aspect of the present invention provides a grain cart comprising a wheeled frame; a container mounted on the frame and having a top and bottom and front, rear and laterally opposed side walls; a lower auger assembly portion having a lower auger housing and a lower auger portion disposed in the lower auger housing, the lower auger assembly extending upwardly from the container bottom; an upper auger assembly portion having an upper auger housing pivotally connected to the lower auger housing and an upper auger portion disposed in the upper auger housing, the upper auger assembly portion being pivotable relative to the lower auger assembly portion between an operating position wherein the upper auger assembly portion extends forwardly and laterally outward from the container at an angularly offset orientation relative to the lower auger assembly portion and a transport position wherein the upper auger assembly portion is disposed along one of the container walls; wherein the upper and lower auger housings include opposed ends configured to abut one another in the operating position, and wherein at least one of the opposed ends is oriented at an oblique angle relative to a longitudinal axis of one of the upper and lower auger housings.

In some embodiments, opposed ends of the upper and lower housings abut one another at an oblique angle relative to longitudinal axes of the upper and lower auger assembly portions. Preferably, the oblique angle is 82.75°.

In some embodiments, the grain cart also includes a control means for controlling the folding/unfolding of the auger from/to an operating position to/from a transport position. According to embodiments of the invention, the control means can be a hydraulic system, an electronic motor. Preferably, the control means can be controlled from a remote location such as from a tractor coupled with the grain cart.

An advantage of folding the upper auger assembly portion diagonally across the front of the cart as described herein is that the auger assembly can be made longer to provide enhanced reach in the operating position. Orienting the upper auger assembly at an operating offset angle relative to the lower auger assembly in the operating position can further enhance forward and/or lateral reach of the auger assembly. Use of a universal joint to couple the upper and lower auger portions is also advantageous because it allows a larger operating offset angle and thus improved reach. Having the upper auger assembly pivot about an obliquely oriented pivot axis is further advantageous in that the upper auger assembly can be made to pivot in closer proximity to the cart thereby facilitating front folding without hitting the tractor.

Other objects and advantages of the present invention will be apparent to those skilled in the art upon reviewing the detailed description of the preferred embodiment and the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable those skilled in the art to make and use the invention. In the drawings, like reference numbers indicate identical or functionally similar elements.

FIGS. 2(a)-(e) depict several different perspectives of a grain cart with an auger assembly in a transport position according to an embodiment of the present invention.

FIGS. 3(a)-(b) depict partial perspective views of the compound angle joint coupling the upper and lower auger portions according to an embodiment of the present invention.

FIG. 5 depicts a detailed view of the auger assembly in the operating position according to an embodiment of the present invention.

FIG. 6 depicts the auger assembly in the transport position according to an embodiment of the present invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1C:
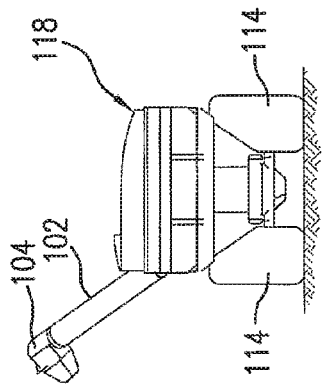
FIGS. 1(a)-(e) depict several different perspectives of a grain cart with an auger assembly in an operating position according to an embodiment of the present invention.
Figure 1B:
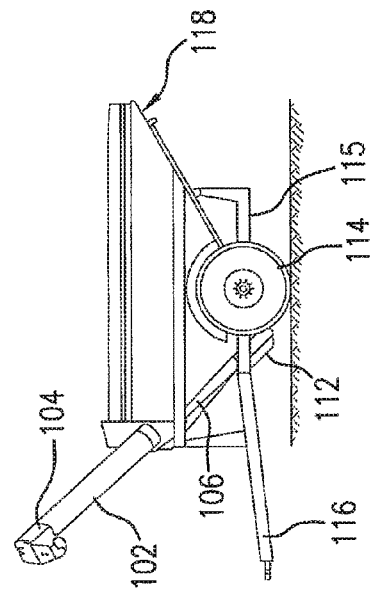
Figure 1A:
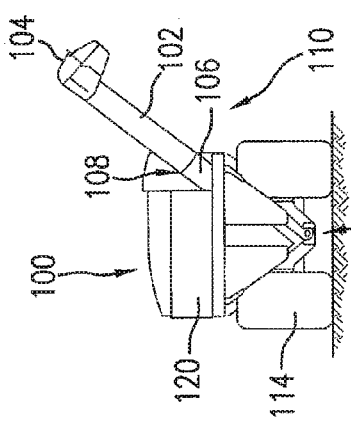
Figure 1E:
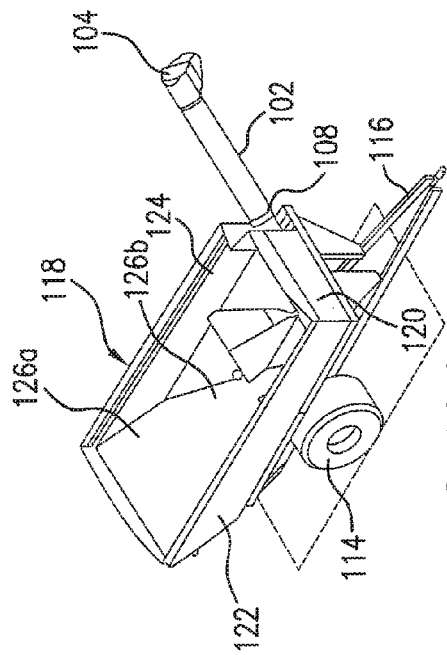
Figure 1D:
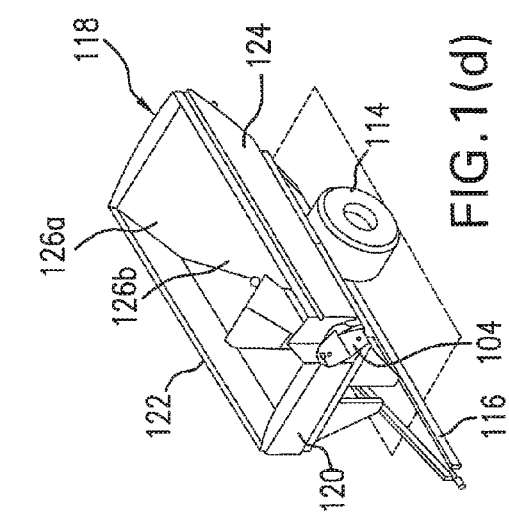

FIGS. 1(a)-(e) depict a grain cart 100 with a front-folding auger assembly 110 in an operating position according to an embodiment of the present invention. The grain cart includes a grain holding container or hopper 118 mounted on a frame 115 with wheels 114 and a hitch 116. The hopper 118 has a front wall or side 120, laterally opposed side walls 122 and 124, and a rear wall or side composed of upper and lower rear wall portions 126a and 126b, which together define a grain holding space with an open top and a bottom. As best seen in FIGS. 1(d) & (e), the upper rear wall portion 126a extends downwardly from the top of hopper 118 at a first angle to intersect with the lower rear wall portion 126b, which extends downwardly therefrom at a second angle which is steeper than the first angle to promote grain flow towards the bottom of the hopper. An intake or receiving portion 112 of the auger assembly 110 is positioned in a sump proximate the base or bottom of the hopper 118 to draw grain from the bottom of the hopper into the auger assembly 110. The auger assembly 110 extends upwardly from the intake 112 to a discharge portion 104 laterally and forwardly spaced from the hopper 118 to facilitate discharge of grain from the auger assembly into another container such as, for instance, another grain cart or rail car located to the side of the grain cart 100.

Auger assembly 110 includes an upper auger assembly portion 102 and a lower auger assembly portion 106. The lower auger assembly portion 106 extends from intake portion 112 at the bottom of hopper 118 to a forward corner of the hopper where the front wall 120 intersects one of the laterally opposed side walls 122 or 124. The upper auger assembly portion 102 is connected to the lower auger assembly portion 106 by a compound angle joint 108 that allows the upper auger assembly portion to be moved between an operating position extending laterally and forwardly outward from the forward corner of the cart and a transport position folded diagonally across the front of the cart. The compound angle joint 108 is preferably configured such that, in the operating position, the upper auger assembly portion 102 is angularly offset from the lower auger assembly portion 106 to the discharge portion 104 at an elevated position forwardly and to the side of the hopper 118. That is, a longitudinal axis of the upper auger assembly portion 102 preferably intersects a longitudinal axis of the lower auger assembly portion 106 at an angle. The discharge portion 104 has a rotatable opening or spout that can be positioned to discharge grain from the auger assembly 110 into another grain cart or the like located to the side of grain cart 100.

FIGS. 2(a)-(e) depict a grain cart 100 with the auger assembly 110 in a transport position according to an embodiment of the present invention. In the transport position, the upper auger assembly portion 102 is folded at joint 108 so that it extends downwardly from the lower auger assembly portion 106 at an angle α (relative to horizontal) diagonally across the front of the hopper 118 and an angle β (relative to a vertical) from the front of the hopper 118. As best seen in FIG. 2(a), the length of the upper auger assembly portion 102 and the transport angle α are such that, in the folded position, the upper auger assembly portion 102 extends diagonally across the front of the cart 100, and the entire auger assembly 110 is disposed within the external dimensional boundaries of the grain cart. This allows the upper auger to be longer allowing for better side and height characteristics (i.e., reach) when compared to other corner auger carts in which the front auger generally sits horizontally across the front or side for storage and transport. Furthermore, it can be seen that the discharge portion 104 does not interfere with or prevent access to the hitch 116 in the transport position. It will be appreciated that the transport offset angle is preferably a compound angle in two or more dimensions relative to the front and/or top of the grain cart. That is, when in the transport position, a longitudinal axis l2 of the upper auger assembly portion is oriented at a first transport offset angle β relative to a line l1 running parallel to the front of the grain cart. Put another way, the first transport offset angle β is in the X-Z plane, as shown in FIG. 2(d). The first transport offset angle β is preferably greater than zero and less than 90°, and more preferably 1.2°, in a direction away from the hopper 118. When in its transport position, the longitudinal axis l3 of the upper auger assembly portion 102 is also oriented at an angle α with respect to a horizontal line l4 extending from the top of the lower auger assembly portion 106 according to some embodiments of the present invention. Put another way, angle α is in the X-Y plane, as shown in FIG. 2(a). Angle α is preferably greater than zero and less than 90°, and more preferably 44°, in a downward direction. Preferably, angles β and α allow the auger assembly 110 to be folded such that the upper auger assembly portion 102 does not extend beyond the outer edge 208 of the grain cart 100. Additionally, it is preferable that the folded auger assembly 110 clear the ladder assembly and still allow access to the hitch 116.

Figure 3B:
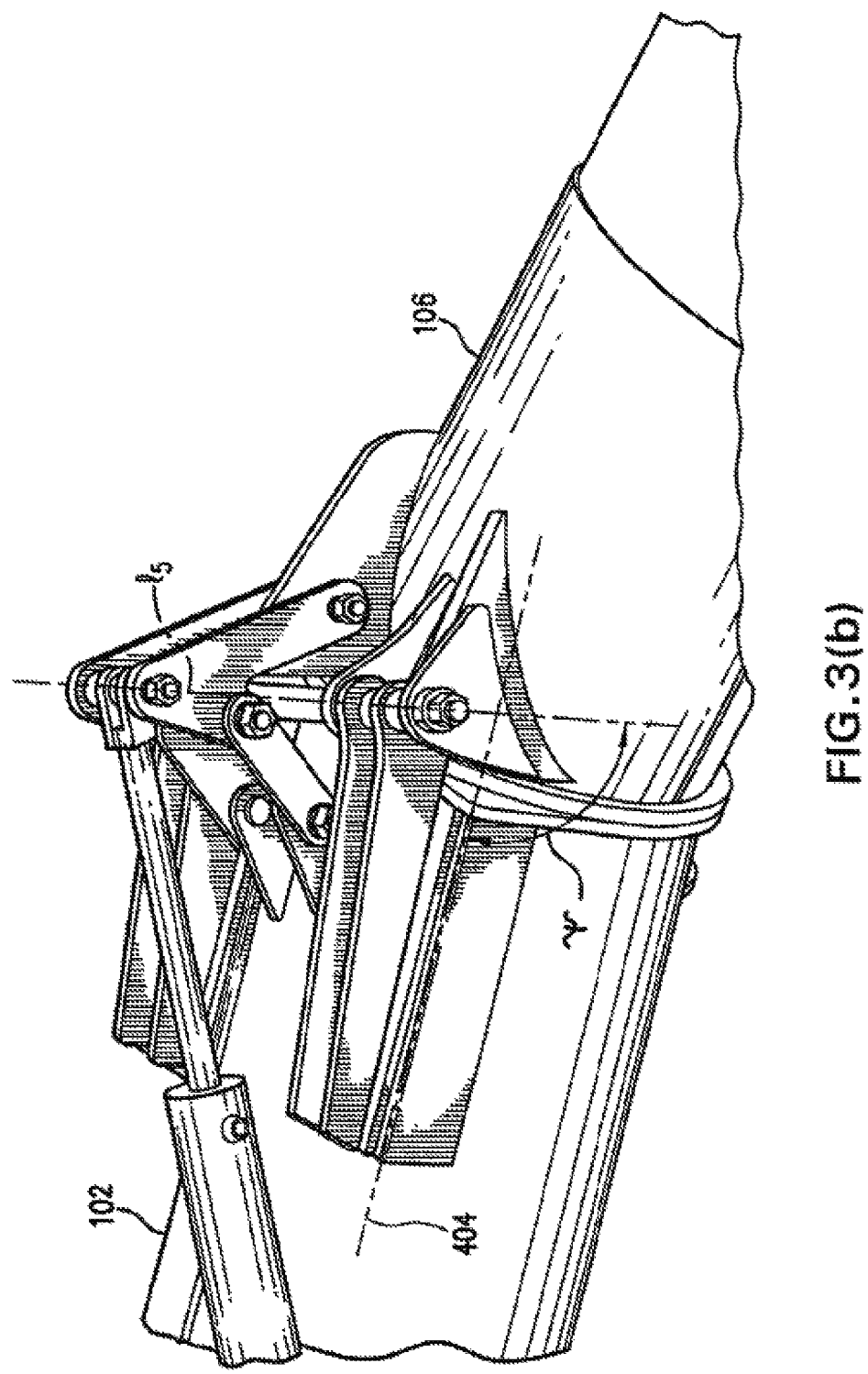

Referring now to FIGS. 3(a) & 3(b), compound angle joint 108 includes an offset hinge portion or pin 202 oriented to cause the upper auger assembly portion 102 to fold in the manner described. In other words, the hinge pin 202 defines a pivot axis about which the upper auger assembly portion 102 can be folded. According to some embodiments of the present invention, the hinge pin 202 is oriented such that the longitudinal axis l5 of hinge pin 202 (i.e., the pivot axis) is oblique (i.e., neither parallel nor perpendicular) to at least one of the planes defined by the flanges 206a & b in the transport position. In a preferred embodiment, the hinge pin axis is not parallel to either of the planes defined by the flanges 206a & b in the transport position. Concurrently, or alternatively, the pivot axis defined by joint 108 is oblique to at least one, and preferably both, respective longitudinal axes of the upper and lower auger assembly portions. In a preferred embodiment, the pivot axis l5 is oriented at an angle φ of about 121° relative to the longitudinal axis 402 of the lower auger assembly portion 106 and an angle ψ of about 107° relative to the longitudinal axis 404 of the upper auger assembly portion 102. The orientation of the pivot axis enables the upper auger assembly 102 to be folded and unfolded without hitting the tractor and to rest diagonally across the front 204 of the grain cart 100 at an angle (referred to above as the transport offset angle) with respect to horizontal and vertical planes aligned with the front and/or top of the grain cart 204 when in the transport position (as can be seen with reference to FIG. 2(d) the upper auger portion 102).

Figure 4:
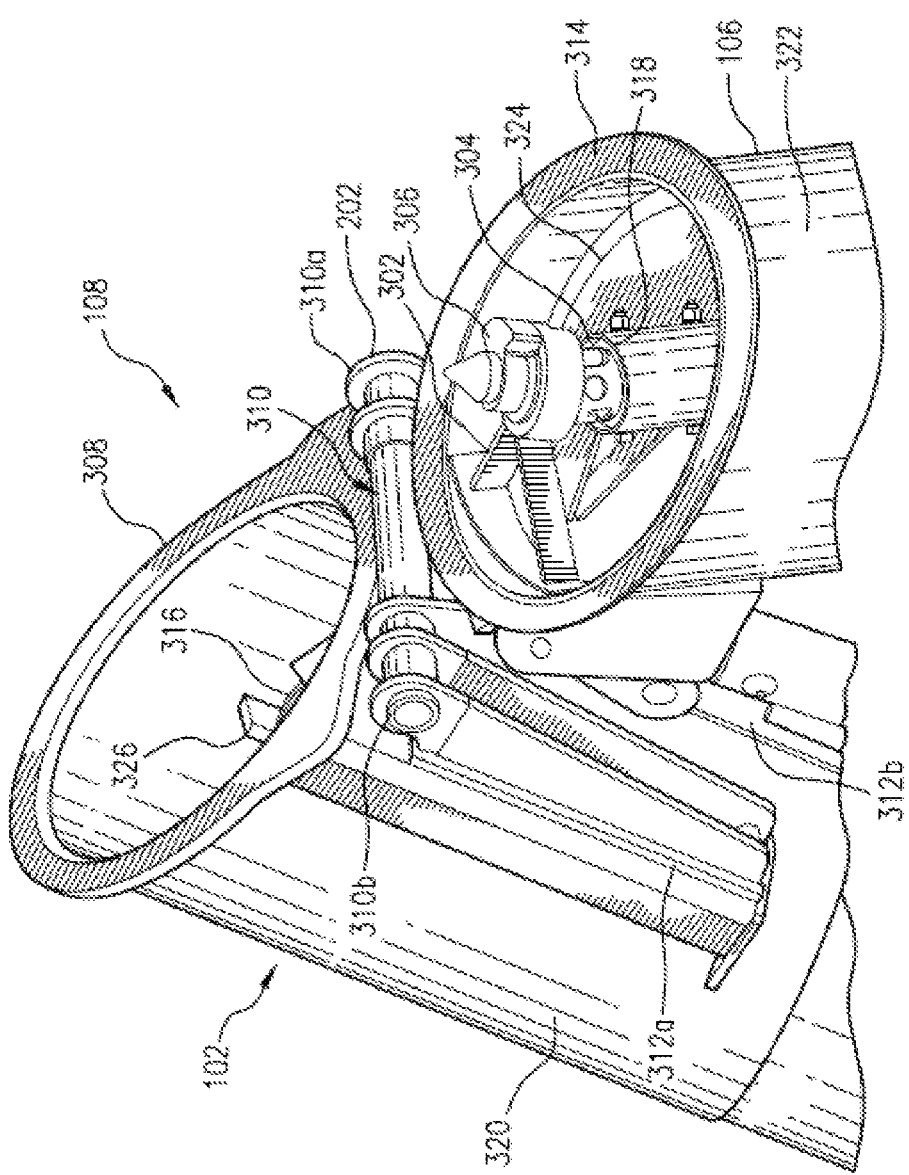
FIG. 4 depicts a detailed view of the compound angle joint coupling the upper auger portion to the lower auger portion according to an embodiment of the present invention.

FIG. 4 depicts a detail view of a compound angle joint 108 for effecting a fold according to an embodiment of the present invention. As can be seen each of the upper auger assembly portion 102 and the lower auger assembly portion 106 includes an auger. The upper auger assembly portion 102 includes an upper auger 326 disposed within an upper tubular housing 320 and the lower auger assembly portion 106 includes a lower auger 324 disposed within a lower tubular housing 322. According to some embodiments of the present invention, the upper auger and lower auger have different diameters. For instance, the lower auger assembly might have a greater diameter than the upper auger assembly. According to other embodiments, the diameters can be the same or the upper auger assembly can have a greater diameter. Additionally, the pitch of the blades of the upper and lower augers can be different according to other embodiments of the invention. Compound angle joint includes offset hinge pin 202, a bearing hanger 302, a joint 304, and auger coupling portions 306 and 316. Auger coupling portion 306 is connected to the lower auger 324 by joint 304 and is held in a desired orientation relative to lower housing 322 by bearing hanger 302. Upper coupling portion 316 is mounted on a portion of the upper auger 326 in alignment with lower coupling portion 306 when upper and lower auger assembly portions are in the operational position shown in FIG. 1. According to some embodiments of the present invention, the joint 304 is a universal, U-joint, or Hooke's joint, however any joint that allows the transfer of rotational motion through an angle would be acceptable. The offset hinge portion 202 includes mounting brackets 312a and 312b that are mounted on the auger assembly such that they are parallel to the center axis of neither the upper auger assembly portion nor the lower auger assembly portion. As can be seen from the figure hinge 310 sits at an angle with respect to flanges 308, 314. For instance, the left portion of the center pin portion 310b in FIG. 4 sits below the flange 308 of the upper auger assembly portion 102, but above the flange of the lower auger assembly portion and the right portion of the center pin portion 310a sits above the flange 308 of the upper auger portion 102, but below the flange of the lower auger portion 106. The orientation could be different according to different embodiments. Also, according to some embodiments of the present invention, such as the embodiment shown in FIGS. 8(a) and 8(b), the offset hinge portion may be configured to move during folding and unfolding or be adjustable to facilitate different orientations of the upper auger portion 102 and the lower auger portion 106 with respect to one another. At least one of the flange portions may be oriented at an oblique angle relative to the longitudinal axis of a respective auger assembly portion 102 or 106. Preferably, both flange portions are oriented at oblique angles relative to the longitudinal axes of their respective auger assembly portions. Center pin 310 can be oriented such that the upper auger portion 102 and the lower auger portion 106 can be rotated about one another in an operating state. When the oblique flanged ends 308 and 314 abut one another, the upper and lower auger portions 102 and 106 are angled relative to each other and coupling portions 306 and 316 mate together to cause concurrent rotation of the upper and lower augers within their respective housings to draw grain from the container and discharge it into another container.

According to some embodiments, the compound angle joint may include a lower auger coupling 306 and an upper auger coupling 316. When lower auger coupling 306 is coupled to upper auger coupling 316, rotational energy is transferred from the lower auger portion to the upper auger portion. Joint 304 allows the lower coupling portion 306 to be oriented at an angle with respect to the axis of the lower auger portion 106 while maintaining contact with the upper coupling portion 316 in the operating position. The bearing hanger 302 allows the lower coupling portion 306 to remain at a constant angle with respect to the lower auger assembly portion 106. The upper auger coupling 316 can be parallel with the upper auger portion 102 according to some embodiments of the present invention. Alternatively, the upper auger coupling 316 could be maintained at an angle with respect to the upper auger portion 102 and the lower auger coupling 306 could be at a parallel angle with the lower auger portion 106. Additionally, the upper and lower auger couplings 306 and 316 can both be configured to have an angle with respect to their respective auger portions 102 and 106.

FIG. 5 depicts the auger assembly 110 in the operating position according to an embodiment of the present invention. As can be seen, the upper auger assembly portion 102 is offset from the lower auger assembly portion 106 by an operating offset angle θ. That is to say that a line 402 (i.e., a longitudinal axis) running through the center of the lower auger portion 106 would be offset by an operating offset angle θ from a line 404 (i.e., a longitudinal axis) running through the center of the upper auger assembly portion 102. This offset angle provides better side reach and forward reach for the auger. The operating offset angle θ ranges from around 0° to 20°, preferably around 12° to 16°, and most favorably around 14.5°, as it has been found that an angle of around 14.5° maximizes side reach and forward reach of the auger. In other words, the upper and lower auger assembly portions need not be co-linear. According to some embodiments of the present invention, the auger assembly 110 includes a control means 406 for controlling the folding/unfolding of the auger from/to an operating position to/from a transport position. According to embodiments of the invention, the control means can be a hydraulic system or an electronic motor. Preferably, the control means can be controlled from a remote location such as from a tractor coupled or hitched to the grain cart. A protrusion or projection 419 is preferably located on the upper portion of the auger assembly 110 between the folding joint and the discharge portion to engage a stop on the front of the cart in the transport position. In an embodiment, the projection 419 includes a pin spaced from the auger housing and the stop defines a cradle that catches the pin to prevent further downward movement of the upper auger portion while also restraining forward movement thereof during transport. The location of the projection 419 allows the upper auger assembly portion to be folded regardless of the rotational orientation of the discharge portion or spout.

FIG. 6 depicts the auger assembly 110 in the transport position from a different vantage point. As can be seen, the compound angle joint 108 is offset so that the auger assembly 110 can fold off the axis. In other words, when folded, the upper and lower auger portions 102, 106 are preferably entirely non-parallel. The advantage of this is that the upper auger assembly portion 102 can fold at an angle in front of and down from the lower auger assembly portion 106. This allows the grain cart itself to remain unchanged (if the upper auger did not fold off the axis in the front-ward direction, the grain cart itself would have to be modified to accommodate the auger in the folding position). Additionally, the upper auger assembly portion 102 folds downwards instead of resting parallel with the top of the grain cart. This allows for increased length of the upper auger assembly portion 102.

Figure 7A:
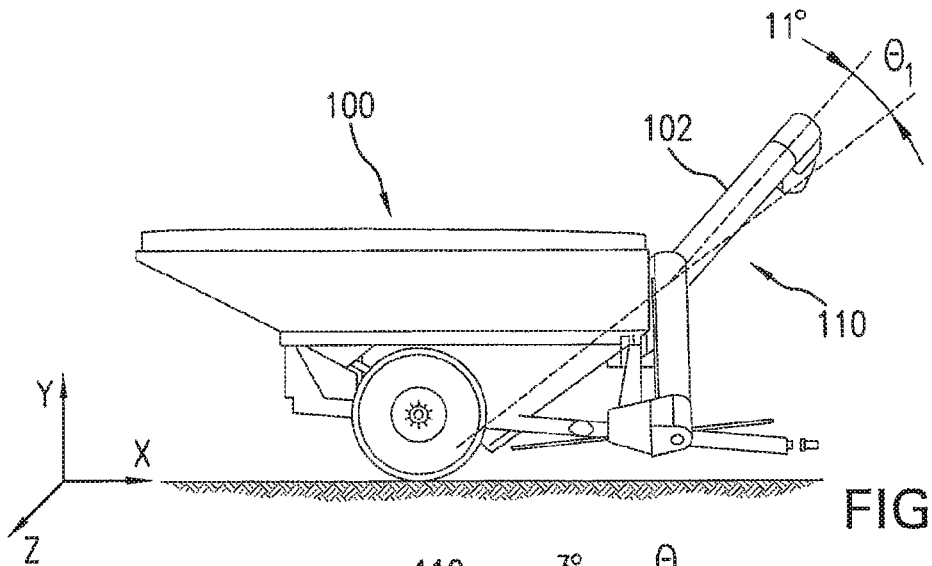
FIGS. 7(a)-(c) depict a grain cart employing the auger assembly according to an embodiment of the present invention from several different perspectives.
Figure 7B:
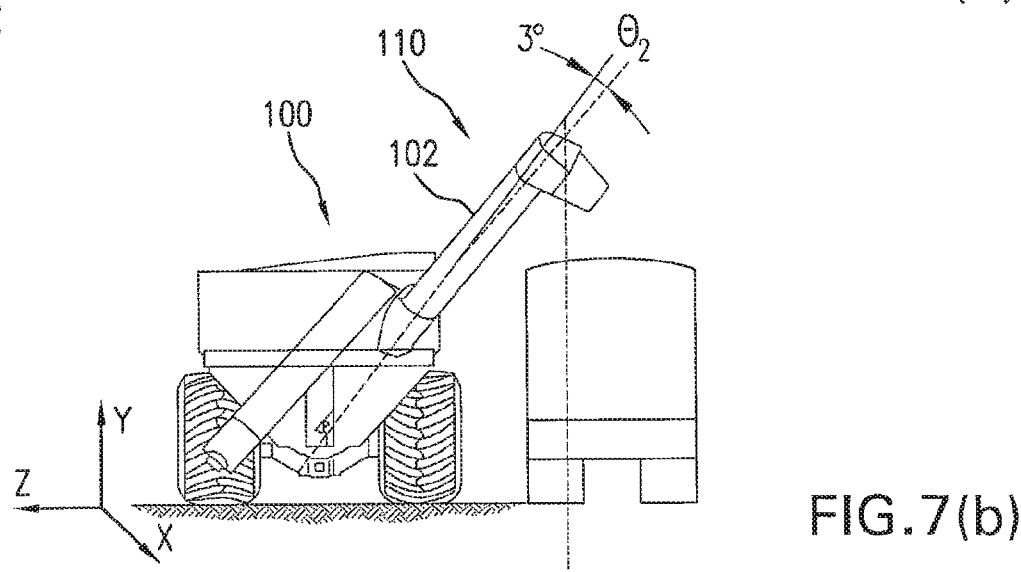
Figure 7C:
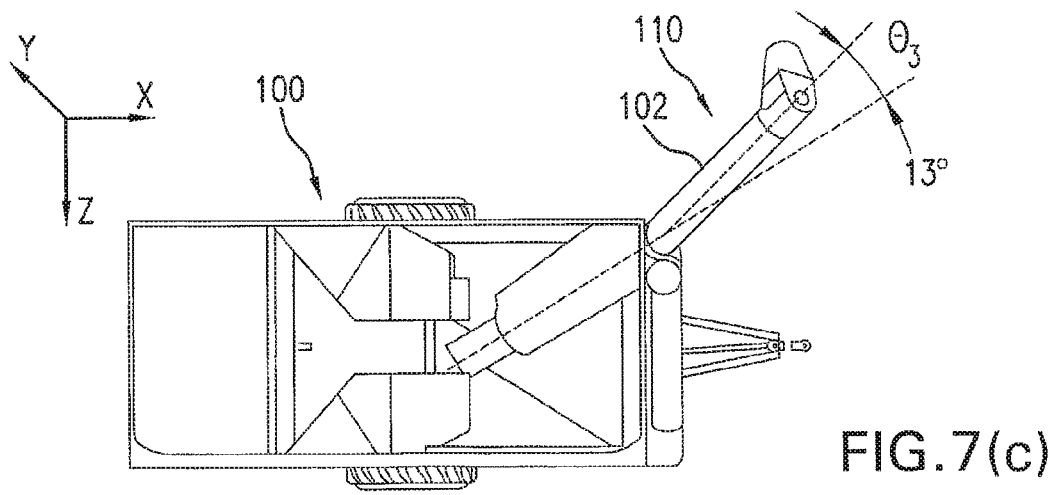

FIGS. 7(a)-7(c) depict a grain cart 100 from several different perspectives according to embodiments of the present invention. In particular, these figures depict an auger assembly 110 in an operating position in which the upper auger assembly portion 102 is angularly offset from the lower auger assembly portion 106 in multiple orthogonal directions. As can be seen from FIGS. 7(a)-7(c), the operating offset angle θ can be viewed as having 3 different components when the auger assembly is mounted on a grain cart. The operating offset angle can be viewed as having: an X-Y component $\theta_1$; a Z-Y component $\theta_2$; and an X-Z component $\theta_3$. As can be seen in FIG. 7(a), the upper auger assembly portion 102 is offset from the lower auger assembly portion 106 by an angle $\theta_1$ in the X-Y plane. FIG. 7(b) shows the upper auger assembly portion 102 offset from the lower auger assembly portion 106 by an angle $\theta_2$ in the Z-Y plane. FIG. 7(c) shows the upper auger assembly portion 102 offset from the lower auger assembly portion 106 by an angle $\theta_3$ in the X-Z plane. According to a preferred embodiment of the present invention, $\theta_1$ is 11°, θ2 is 3°, and $\theta_3$ is 13°.

Figure 8A:
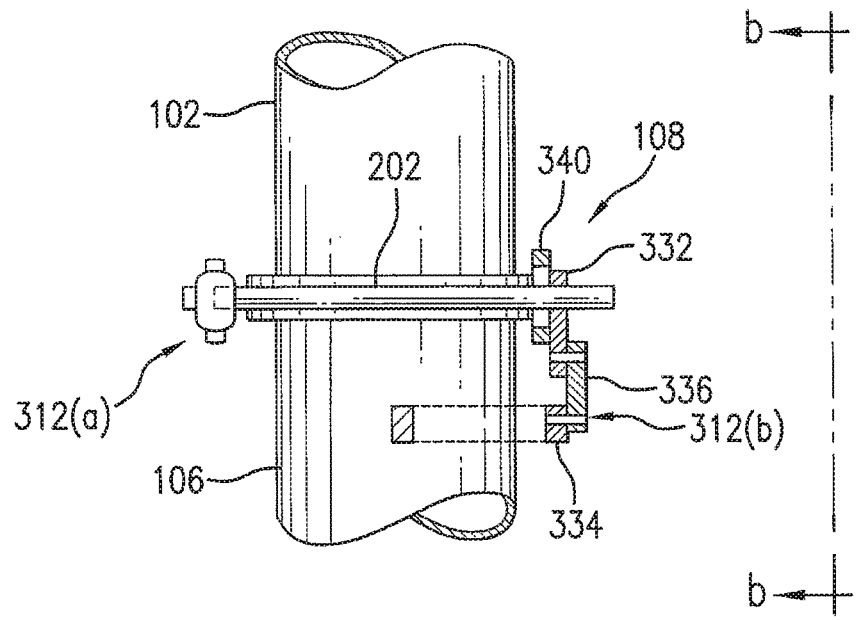
FIGS. 8(a) and (b) depict detailed views of an embodiment of the compound angle joint with a hinge pin that moves relative to at least one of the upper and lower auger portions.
Figure 8B:
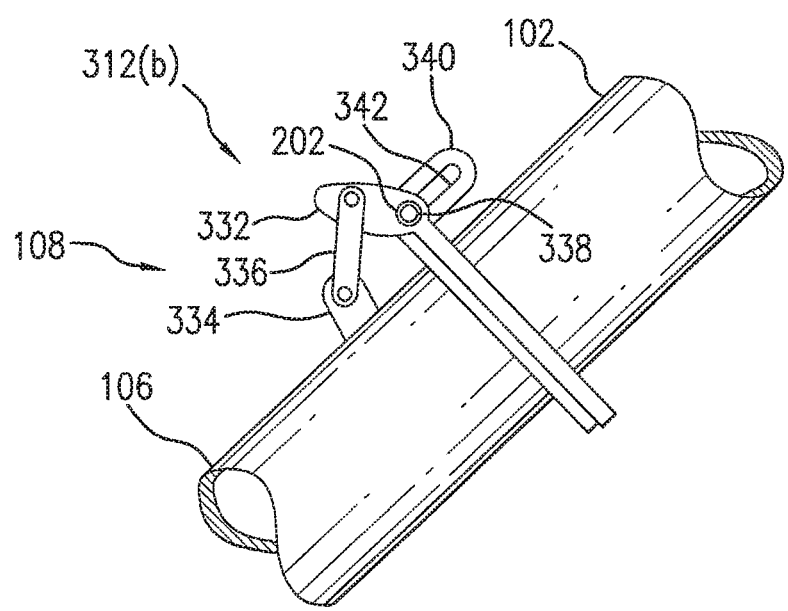

FIGS. 8(a) and 8(b) are detailed views of an embodiment of the compound angle joint 108 with a movable hinge pin 202. In this embodiment, the hinge pin 202 is supported by a fixed mounting bracket or joint 312(a) at one end and by a movable mounting bracket or joint 312(b) at the other end. The fixed joint 312(a) is preferably a ball joint with mounting points attached to upper and lower auger portions 102 and 106. The movable joint 312(b) includes an upper lug 332 attached to the upper auger portion 102, a lower lug 334 attached to the lower auger portion 106, and a link 336 pivotally connecting the upper and lower lugs. The upper lug 332 includes an opening 338 for receiving the hinge pin 202. The movable joint 312(b) also includes a slotted member 340 that extends from the lower auger assembly 106 and includes a slot 342 receiving the hinge pin 202.

In operation, as the upper auger portion 102 is folded relative to the lower auger portion 106, the end of the hinge pin 202 supported by the fixed joint 312(a) remains essentially stationary while the end of the hinge pin 202 supported by the movable joint 312(b) moves with the upper lug 332 within the slotted member 340. As a result, the hinge pin 202 pivots from an operating position at a first angle relative to the plane of intersection between the upper and lower auger portions 102 and 106 to a transport position at a second angle relative to the plane of intersection. In a preferred embodiment, the second angle is about 10°-15° greater than the first angle. In the embodiment shown, the first angle is substantially parallel to the plane of intersection; however, it will be appreciated that the first angle can be offset slightly (e.g., 1°-5°) from the plane of intersection. It will also be appreciated that this embodiment permits the plane of intersection to be perpendicular to the longitudinal axes of the upper and lower augers, if desired.

In an alternative embodiment, the link 336 can be of adjustable length to facilitate different orientations of the upper auger portion 102 and the lower auger portion 106 with respect to one another by changing the relative positions of the mounting brackets 312(a) and 312(b) thereby allowing a changeable transport offset angle.

Thus, a number of preferred embodiments have been fully described above with reference to the drawing figures. Other details of the embodiments of the invention should be readily apparent to one skilled in the art from the drawings. Although the invention has been described based upon these preferred embodiments, it would be apparent to those skilled in the art that certain modifications, variations, and alternative constructions would be apparent, while remaining within the spirit and scope of the invention. For example, a gear box with a pair of beveled gears or a double U-joint could be used as a coupling for the upper and lower auger portions instead of a single U-joint. Furthermore, if desired, the lower auger portion can be a turbo auger as disclosed in U.S. patent application Ser. No. 12/192,821, titled "Improved Auger for a Grain Cart," filed on Aug. 16, 2007, the entire contents of which are incorporated herein by reference. Additionally, while the grain cart has been shown and described with two wheels on a single axle, it will be appreciated by those skilled in the art that the folding auger of the present invention can be utilized in a cart having walking-tandem dual wheels, steerable tandem axles and other wheel arrangements. These and other modifications of the present invention are intended to be within the scope of the appended claims.

What is claimed is:

1. A grain cart comprising:
    a wheeled frame;
    a container mounted on said frame and configured to hold a quantity of grain, said container having front, rear and laterally opposed side walls;
    a folding auger assembly having upper and lower auger assembly portions connected by a joint assembly, said lower auger assembly portion having a lower auger housing with first and second ends and a lower auger portion rotatably disposed in said lower auger housing, and said upper auger assembly portion having an upper auger housing with first and second ends and an upper auger portion rotatably disposed in said upper auger housing;
    wherein said first end of said lower auger housing has an intake opening proximate a bottom of said container to receive grain and said second end of said lower auger housing is disposed adjacent a forward corner of said container where said front wall intersects one of said laterally opposed side walls;
    wherein said first end of said upper auger housing is disposed adjacent said second end of said lower auger housing and said second end of said upper auger housing has a discharge opening to discharge grain from said container;
    wherein said joint assembly defines a pivot axis about which said upper auger assembly portion is pivotable relative to said lower auger assembly portion between an operating position in which said first end of said upper auger housing abuts said second end of said lower auger housing to permit grain to be discharged from said container and a transport position in which said upper auger assembly portion extends along a wall of said container to facilitate transporting said grain cart;
    wherein a longitudinal axis of said lower auger assembly portion extends upwardly, forwardly, and laterally outward relative to said forward corner of said container and wherein a longitudinal axis of said upper auger assembly portion is oriented at an angular offset relative to said longitudinal axis of said lower auger assembly portion in said operating position, wherein said angular offset includes a laterally outward component so that said upper auger assembly portion extends laterally outward relative to said longitudinal axis of said lower auger assembly portion thereby increasing side reach of said upper auger assembly portion;

wherein said upper auger assembly portion includes a first auger coupling portion and said lower auger assembly portion includes a second auger coupling portion, and wherein at least one of said first and second auger coupling portions is angularly offset from a longitudinal axis of at least one of said upper and lower auger housings and connected to a joint that allows the transfer of rotational motion through an angle;

wherein said first auger coupling portion is configured to releasably engage with said second auger coupling portion in said operating position, and said first auger coupling portion is configured to disengage from said second auger coupling portion; and wherein said joint transmits rotational forces through said angular offset when said first and second auger coupling portions are releasably engaged in said operating position.

2. The grain cart of claim 1, wherein said joint includes a universal joint.

3. The grain cart of claim 1, wherein said joint includes a gear box.

4. The grain cart of claim 3, wherein said gear box includes a pair of beveled gears.

5. A grain cart comprising:
a wheeled frame;
a container mounted on said frame and configured to hold a quantity of grain, said container having front, rear and laterally opposed side walls;
a folding auger assembly having upper and lower auger assembly portions connected by a joint assembly, said lower auger assembly portion having a lower auger housing with first and second ends and a lower auger portion rotatably disposed in said lower auger housing, and said upper auger assembly portion having an upper auger housing with first and second ends and an upper auger portion rotatably disposed in said upper auger housing;
wherein said first end of said lower auger housing has an intake opening proximate a bottom of said container to receive grain and said second end of said lower auger housing is disposed adjacent a forward corner of said container where said front wall intersects one of said laterally opposed side walls;
wherein said first end of said upper auger housing is disposed adjacent said second end of said lower auger housing and said second end of said upper auger housing has a discharge opening to discharge grain from said container;
wherein said joint assembly defines a pivot axis about which said upper auger assembly portion is pivotable relative to said lower auger assembly portion between an operating position in which said first end of said upper auger housing abuts said second end of said lower auger housing to permit grain to be discharged from said container and a transport position in which said upper auger assembly portion extends along a wall of said container to facilitate transporting said grain cart;

wherein a longitudinal axis of said lower auger assembly portion extends upwardly, forwardly, and laterally outward relative to said forward corner of said container and wherein a longitudinal axis of said upper auger assembly portion is oriented at an angular offset relative to said longitudinal axis of said lower auger assembly portion in said operating position, wherein said angular offset includes a laterally outward component so that said upper auger assembly portion extends laterally outward relative to said longitudinal axis of said lower auger assembly portion thereby increasing side reach of said upper auger assembly portion;

wherein said upper auger assembly portion includes a first auger coupling portion and said lower auger assembly portion includes a second auger coupling portion, and wherein at least one of said first and second auger coupling portions is angularly offset from a longitudinal axis of at least one of said upper and lower auger housings and connected to a joint that allows the transfer of rotational motion through an angle;

wherein said first auger coupling portion is configured to releasably engage with said second auger coupling portion in said operating position, and said first auger coupling portion is configured to disengage from said second auger coupling portion;

wherein said joint transmits rotational forces through said angular offset when said first and second auger coupling portions are releasably engaged in said operating position; and wherein at least one of said first end of said upper auger housing and said second end of said lower auger housing is oriented at an oblique angle relative to a longitudinal axis of said respective housing.

6. The grain cart of claim 5, wherein said first end of said upper auger housing and said second end of said lower auger housing are each oriented at an oblique angle relative to a longitudinal axis of said respective housing.

7. The grain cart of claim 6, wherein said joint includes a universal joint.

8. The grain cart of claim 6, wherein said joint includes a gear box.

9. The grain cart of claim 8, wherein said gear box includes a pair of beveled gears.

10. A grain cart comprising:
a wheeled frame;
a container mounted on said frame and configured to hold a quantity of grain, said container having front, rear and laterally opposed side walls;
a folding auger assembly having upper and lower auger assembly portions connected by a joint assembly, said lower auger assembly portion having a lower auger housing with first and second ends and a lower auger portion rotatably disposed in said lower auger housing, and said upper auger assembly portion having an upper auger housing with first and second ends and an upper auger portion rotatably disposed in said upper auger housing;
wherein said first end of said lower auger housing has an intake opening proximate a bottom of said container to receive grain and said second end of said lower auger housing is disposed adjacent a forward corner of said container where said front wall intersects one of said laterally opposed side walls;
wherein said first end of said upper auger housing is disposed adjacent said second end of said lower auger housing and said second end of said upper auger housing has a discharge opening to discharge grain from said container;

wherein said joint assembly defines a pivot axis about which said upper auger assembly portion is pivotable relative to said lower auger assembly portion between an operating position in which said first end of said upper auger housing abuts said second end of said lower auger housing to permit grain to be discharged from said container and a transport position in which said upper auger assembly portion extends along a wall of said container to facilitate transporting said grain cart;

wherein a longitudinal axis of said lower auger assembly portion extends upwardly, forwardly, and laterally outward relative to said forward corner of said container and wherein a longitudinal axis of said upper auger assembly portion is oriented at an angular offset relative to said longitudinal axis of said lower auger assembly portion in said operating position, wherein said angular offset includes a laterally outward component so that said upper auger assembly portion extends laterally outward relative to said longitudinal axis of said lower auger assembly portion thereby increasing side reach of said upper auger assembly portion;

wherein said upper auger assembly portion includes a first auger coupling portion and said lower auger assembly portion includes a second auger coupling portion, and wherein at least one of said first and second auger coupling portions is angularly offset from a longitudinal axis of at least one of said upper and lower auger housings and connected to a joint that allows the transfer of rotational motion through an angle;

wherein said first auger coupling portion is configured to releasably engage with said second auger coupling portion in said operating position, and said first auger coupling portion is configured to disengage from said second auger coupling portion;

wherein said joint transmits rotational forces through said angular offset when said first and second auger coupling portions are releasably engaged in said operating position; and wherein said at least one angularly offset coupling portion is held in place at said angular offset by a hanger.

11. The grain cart of claim 10, wherein said first end of said upper auger housing and said second end of said lower auger housing are each oriented at an oblique angle relative to a longitudinal axis of said respective housing;

wherein said second auger coupling portion of said lower auger assembly portion is held in place at said angular offset by said hanger;

further comprising a hydraulic system extending between said upper and lower auger assembly portions, wherein said upper auger assembly portion pivots relative to said lower auger assembly portion via said hydraulic system; and wherein said hydraulic system includes a first end connected to said lower auger assembly portion and a second end connected to said upper auger assembly portion.

12. The grain cart of claim 11, wherein said joint includes a universal joint.

13. The grain cart of claim 11, wherein said joint includes a gear box.

14. The grain cart of claim 13, wherein said gear box includes a pair of beveled gears.

\* \* \* \* \*